June 14, 1949. D. F. SKLAR 2,473,179
BRIDGE-TYPE HARDNESS TESTER
Filed July 15, 1946 3 Sheets-Sheet 1
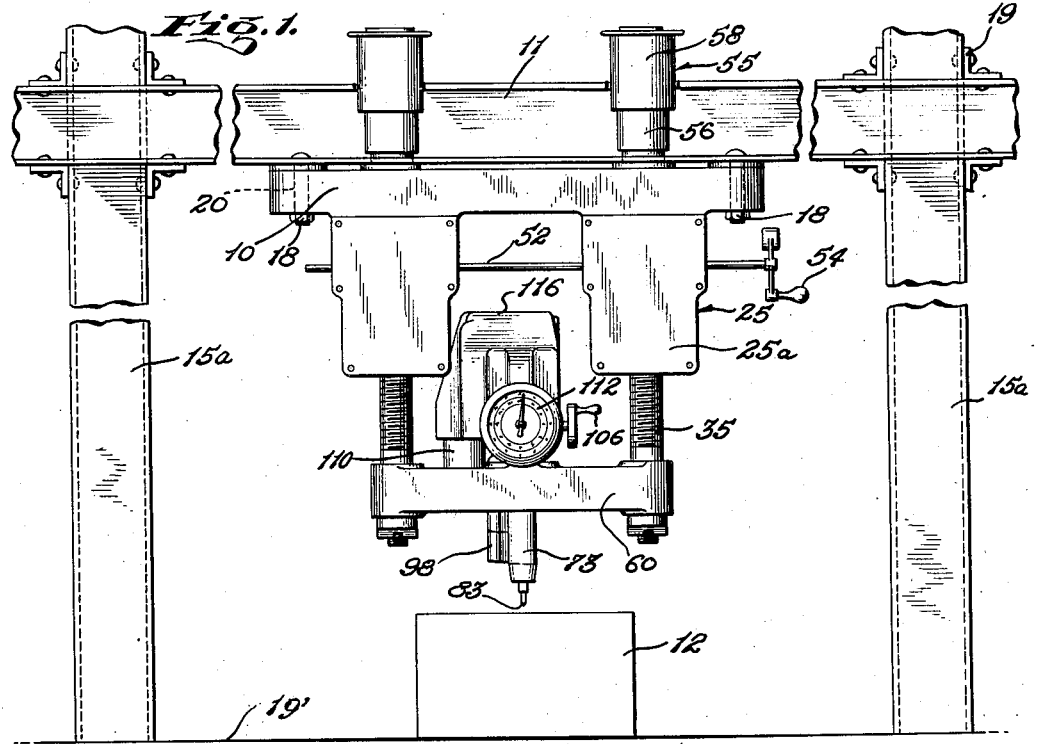
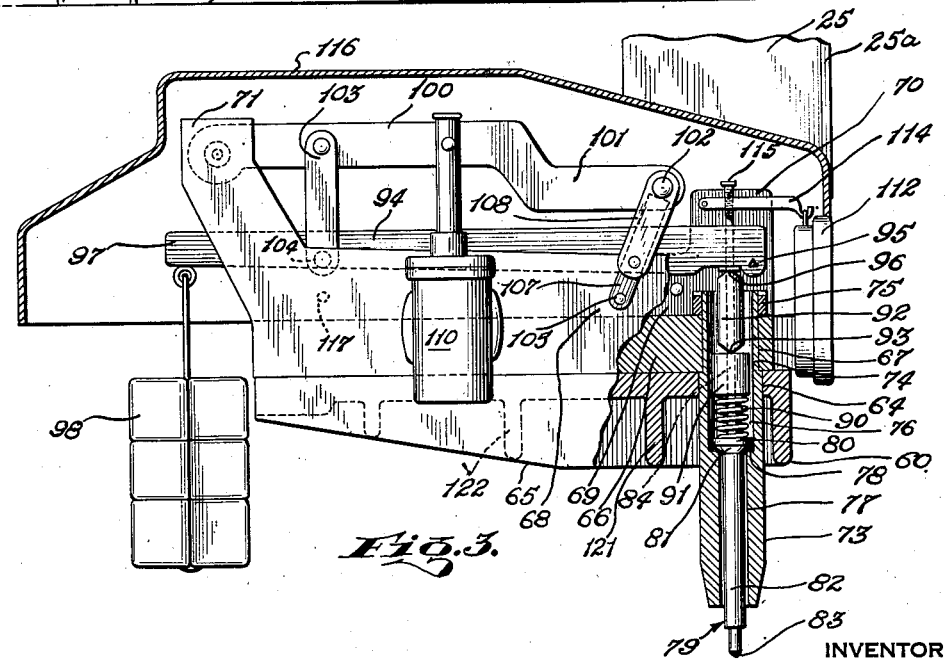
INVENTOR
DAVID F. SKLAR
BY
ATTORNEY

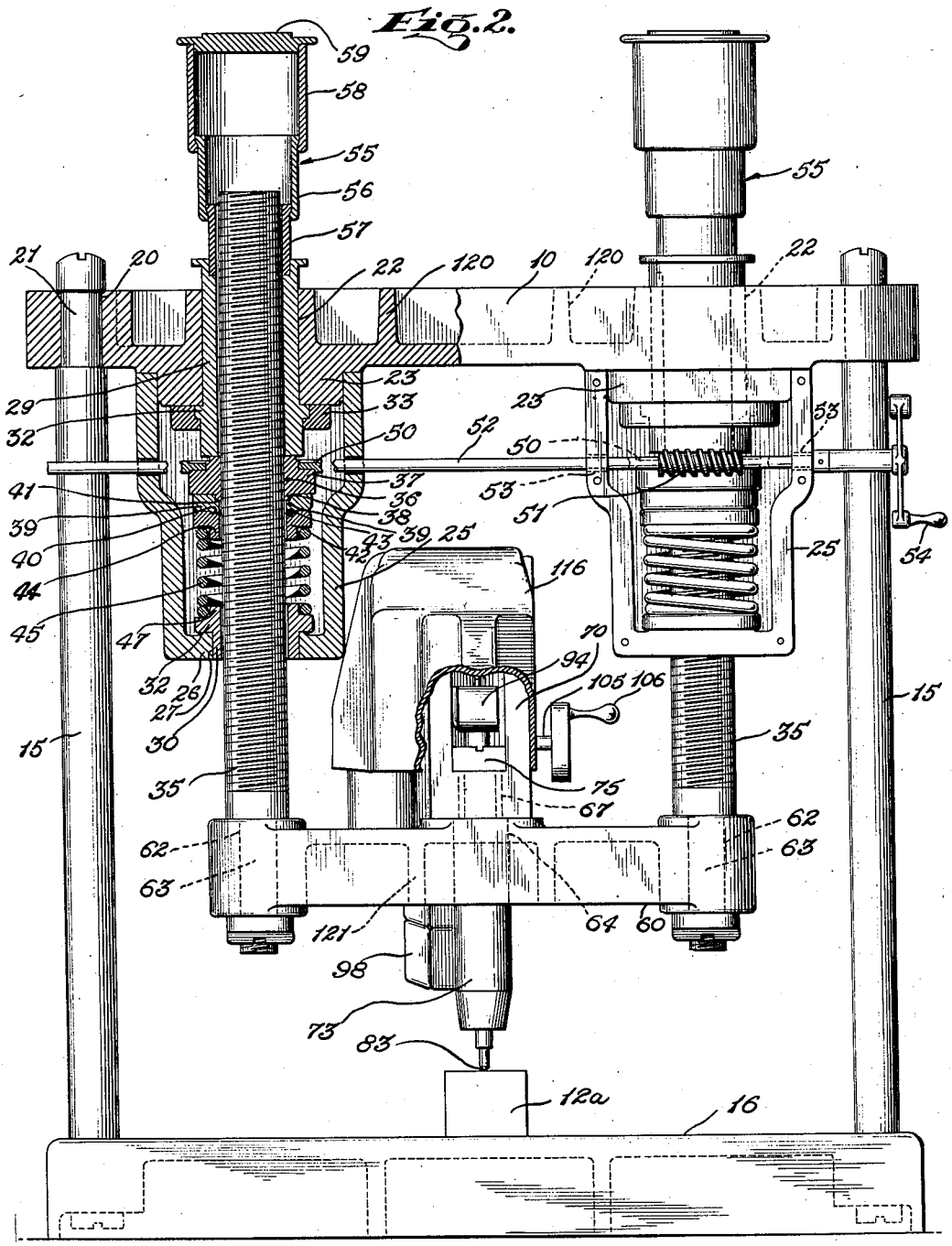

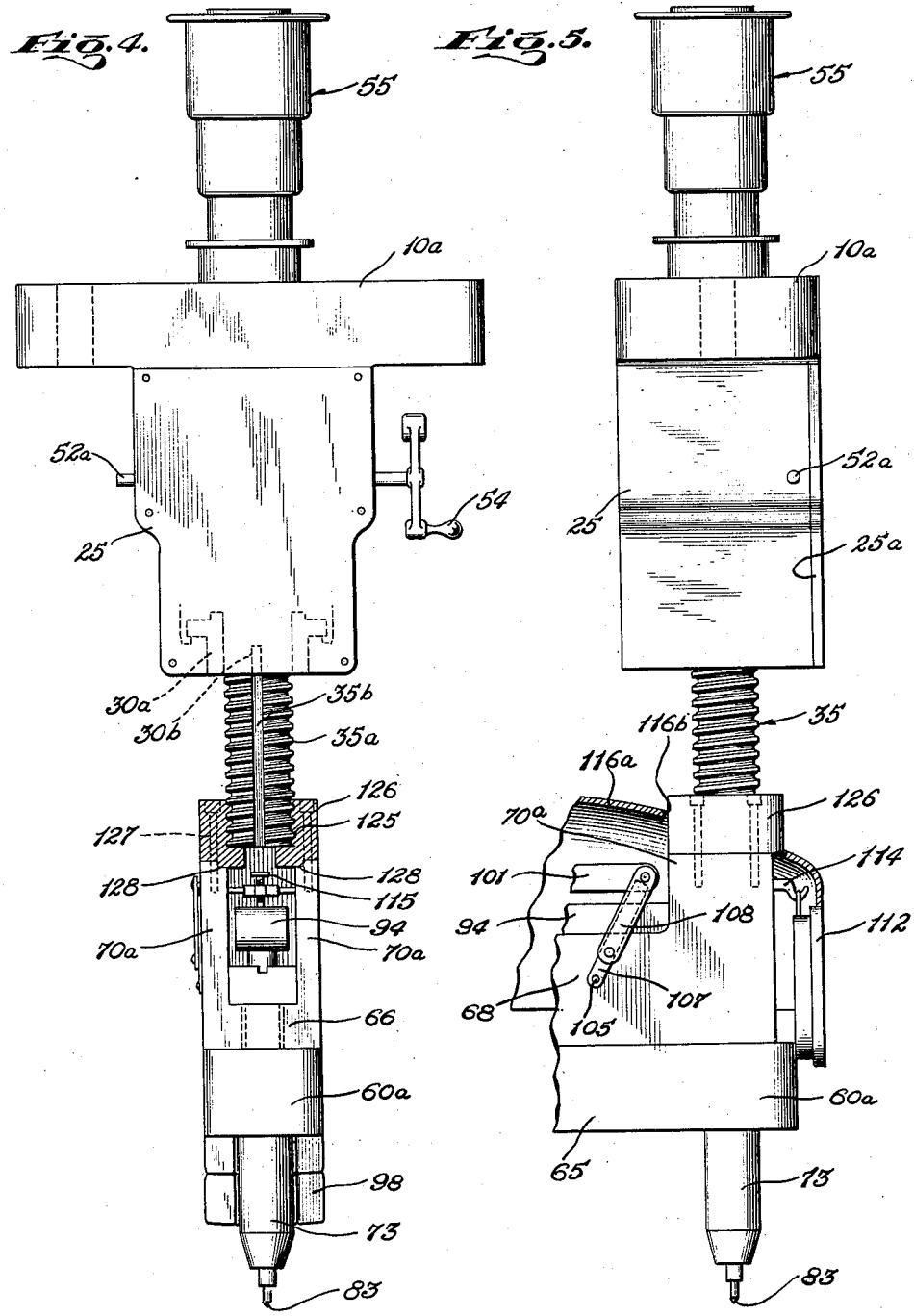

Patented June 14, 1949

2,473,179

UNITED STATES PATENT OFFICE 2,473,179

BRIDGE-TYPE HARDNESS TESTER

David F. Sklar, Brooklyn, N. Y., assignor to Wilson Mechanical Instrument Co., Inc., New York, N. Y., a corporation of New York Application July 15, 1946, Serial No. 683,610

20 Claims. (Cl. 73—83)

1

This invention relates to machines for testing the hardness of metals or like materials and more particularly to machines for testing the hardness of large or heavy articles, or structures or parts thereof that could not be easily handled by the type of hardness testing machines having movable test piece supports; though it is noted that in some of the claims the invention is not limited to machines for testing heavy or bulky articles.

One object of the invention is to provide an improved testing machine of this kind which is particularly adaptable to be mounted over a part of a separately supported large machine or structure, accommodating the testing machine to the structure of which the hardness is to be tested rather than moving or accommodating said structure to the testing machine.

Other objects of the invention are to provide in an improved machine of this kind, means for preventing objectionable lost motion or looseness between parts of the machine, and to provide a means for dust-proofing parts and to provide a machine which may be conveniently secured to a supporting structure over the part to be tested.

Additional objects of the invention are to effect simplicity and efficiency in such machines and to provide an extremely simple machine of this kind which is accurate, reliable and durable in operation, and economical to manufacture and install.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with a hardness testing machine which briefly stated, includes a horizontal elongated fixed bridge adapted to be supported above a test piece and having upper bearing bores therein and carrying housings secured fast on the bridge having removable front walls, lower bearing openings, the bores and openings respectively receiving bushings receiving pending screws carrying a lower movable bridge fast on the lower ends of the screws. An internally threaded collar on each screw is pressed against the upper bushings by a spring compressed between the lower bushing and the collar; and means are

2 provided for simultaneously rotating said collars for raising and lowering the movable bridge.

The movable bridge and a rearward extension thereof carry testing mechanism comprising a vertical plunger mounted for vertical movement on the movable bridge and carrying a penetrator point below the bridge, means being provided for applying a minor load to the plunger as the bridge is lowered and for subsequently applying a major load to the plunger to effect penetration to operate a gauge operatively connected to the plunger.

In the accompanying drawing showing, by way of example, one of many possible embodiments of the invention, Fig. 1 is a front elevation of the machine mounted on a structure which may be erected over a separately supported part to be tested;

Fig. 2 is a front elevation showing the machine mounted on a different structure, one of the housing front walls being removed, the other housing and associated parts being shown in axial section;

Fig. 3 is a side elevation of said extension and testing mechanism thereon, part being shown in vertical section; and Figs. 4 and 5 are respectively front elevation, parts being removed, and fragmental side elevation of another form of the tester.

The various parts of my improved hardness tester are carried pending from a horizontally elongated fixed bridge 10 adapted to be secured on the lower face of a suitable support 11 (Fig. 1) held above a test piece 12 or to be supported on a frame 15, 16 (Fig. 2) including a base 16 on which a test piece 12a is supported.

The test piece 12 may be a part of a large machine too large to accommodate itself to the frame 15, 16, and a particular object of the present invention is to provide a hardness tester particularly adapted to be secured in pending position from a frame which may be designed and constructed by the shop or firm using the hardness tester.

Such a frame is somewhat diagrammatically illustrated in Fig. 1 and comprises an upper support or channel beam 11 to the lower face of a lower web of which said fixed bridge is secured by bolts 18, as will be explained. Said support or beam 11 is shown supported on two suitably supported upright channel members 15a, angle pieces 19 being bolted to flanges of the members 15a and beam 11 to support the latter. Bolt holes may be provided at any point along said flanges to accommodate the frame to the particular part to be tested.

The frame 11, 15a and test piece 12 may be separately supported on the floor or ground 19', or the tester may be supported on a frame erected on the machine having the part to be tested. Any other suitable supporting structure may be used.

The fixed bridge has vertical end bores 20 in its opposite ends in which are received the bolts 18 (Fig. 1) or the reduced upper ends 21 of the columns 15 of the frame 15, 16, the lower ends being similarly held fast on the elongated flat base 16 adapted to receive the test piece 12 thereon.

Said bridge 10 has intermediate axially vertical upper bearing bores 22 (Fig. 2) near said end bores, and lower rectangular bosses 23 surrounding the bearing bores and receiving housings 25 secured fast to the lower face of the bridge, having removable front walls 25a (Fig. 3). Each housing has an open upper end received on the associated boss, and a lower wall 26 having a lower bearing opening 27 therein in vertical alinement with the upper bearing bore. Intermediately flanged upper and lower bearing bushings 29, 30 are disposed in said bearing bore and opening respectively, the flanges 31, 32 thereof engaging against the boss and lower wall respectively. An undercut collar 33 mounted fast on the lower face of the boss 23 around the associated bushing has an inner flange engaged under the flange 32 to hold the upper bushing in the bore.

Operating screws 35 are vertically slidable on the bushings and each receives thereon an internally threaded collar 36 engaged with the upper bushing and having an intermediate flange 37 and a reduced diameter lower portion 38. A bearing washer 39 engages on the lower face of the collar flange and has a lower reduced diameter portion 40, and an inner rabbet groove 41 receiving said reduced portion 38 of the collar to hold the washer spaced from the screw. A thrust washer 42 engaged against the lower face of the bearing washer has an upper inner groove 43 receiving the reduced portion 40 of the bearing washer, and has a lower reduced diameter portion 44. A strong helical spring 45 compressed between the thrust washer 42 and the flange 32 of the lower bushing receives the reduced diameter portions 47, 44 of said bushing 30 and thrust washer 42 to hold the threaded collar 37 firmly seated against the upper bearing bushing 29.

Worm wheels 50 mounted fast on collars 36 and the upper face of the flange 37 thereof are engaged by worms 51 fast on a worm shaft 52 rotary in alined pairs of alined bearings 53 set in opposite walls of the housings 25 respectively. A counterbalanced crank 54 is mounted fast on one end of said shaft, whereby said shaft, worms and worm wheels may be rotated to lower or raise the operating screws 35.

Inverted telescoping cups 55 are mounted over the ends of the operating screws 35 respectively to prevent access to the screws of dust or other foreign matter. Each cup comprises an intermediate section 56, a lower section 57 secured fast to the upper bushing 39, and upper section 58 having an upper end wall 59.

A movable bridge 60 has end bores 62 received and held fast on reduced lower portions 63 of the screws, whereby the bridge 60 is lowered and raised when the screws 35 are lowered and raised.

The helical springs 45 are quite strong and are amply strong enough to overcome the weight of the bridge 60 and all parts supported thereon thereby to hold the collar 36 firmly against the bushing 29 to prevent any lost motion between the collar, bushing or bridge 10.

Said movable bridge has at its mid-part a central axially vertical bore 64 and a rear supporting extension 65 (Fig. 3) perpendicular to the bridge and supporting a testing mechanism about to be described including a base 66 fast on said bridge and extension and having a bore 67 coaxial with the central bore 64, and spaced side walls 68, 69 provided with spaced front standards 70 and spaced rear standards 71. A plunger sleeve 73, 74 having a large lower portion 73 in said central bore 64 and a threaded reduced diameter portion 74 fitted in the bore 67 of said base, carries a nut 75 on said threaded portion engaging said base 66 and holding the sleeve in place. Said sleeve has a bore 76 therethrough having a reduced diameter lower portion 77 forming an intermediate upwardly facing conical seat 78. A plunger 79 in said sleeve of the bridge and having an intermediate cylindrical portion 80 has a lower conical face 81 resting on said seat, a lower reduced diameter portion 82 in the lower part of the sleeve carrying a penetrator 83 at the lower end, and an upper loading rod 84 coaxial with the sleeve and extending to near the top of the front standards 70.

A helical minor load spring 90 around the rod rests on said cylindrical portion 80; and a seating collar 91 slidably received on the rod rests on the spring. A tubular double knife edge member 92 on the rod has its lower knife edge 93 resting on the seating collar; and a major load power lever 94 between said side walls 68, 69 has knife edges 95 fulcrumed on said standards 70 a short distance from the member 92, the lever resting on the upper knife edge 96 of the member 92 and having its rear free end 97 projecting beyond the base and carrying a major load weight 98.

A control lever 100 fulcrumed between said rear standards 71 and extending to near the front standards is laterally offset (frontwardly offset in Fig. 3) at its forward free end 101 which is provided with a transverse pin 102. The lever 100 is provided intermediately near its fulcrum end with a link 103 carrying a lateral pin 104 engaging in an opening in the power lever 94 for raising and lowering the latter.

A rotary spindle 105 (Figs. 2 and 3) transversely mounted in said side walls 68, 69 to the rear of the front standard is provided with an outer end crank 106 and at the inner end with a trip arm 107 engaging against said transverse pin 102 of the control lever 100 to hold the latter and the power lever raised until forward movement of the crank 106 causes the trip arm to release the control lever and allow the control lever to move downwardly. A toggle link 108 pivoted on said transverse pin 102 and an intermediate part of the trip lever 107 serves for raising the control lever on reverse rotation of the spindle 105. A dash-pot 110 mounted on the side wall 68 has its piston rod connected to the control lever for preventing sudden dropping of said levers 94 and 100.

A dial gauge 112 (Figs. 1 and 3) mounted on the front end of the base 66 has its actuating part connected to the free end of a gauge control lever 114 fulcrumed between the rear part of said front standards 70 having an intermediate set screw 115 resting on the loading rod 84. A housing 116 secured by screws 117 to the side walls 69 covers said walls 68, 69, standards 70, 71 and levers 94, 100.

The bridges 10 and 16 and the extensions 65 may be hollowed out and provided with inner strengthening ribs 120, 121 and 122 respectively, if desired.

The operation of the tester will be readily understood and need be only summarized as follows:

The piece 12, 12a to be tested may be placed under the penetrator or the tester may be placed over the part to be tested. Then the handle 54 is turned to gently lower the bridge 60 until the penetrator 83 comes into contact with the test piece. The turning of the crank 54 is continued slowly until the plunger 79 compresses the minor load spring 90 sufficiently to apply the minor load.

The major load may then be applied by pressing the crank handle 106 forwardly to release the trip arm 107 from the pin 102. This allows the lowering of the levers 94 and 100 and applies the major load uniformly to the penetrating point 83, forcing it into the test piece to a depth depending upon its hardness. The major load is then removed before taking the hardness number from the dial. This is done by turning the crank handle rearwardly causing the trip lever 107 and link 108 to act as a toggle raising the lever 100 and bringing the end of the trip lever 107 under the pin 102 to hold the levers 94 and 100 and the penetrator raised, after which the reading may be taken from the dial.

While two operating screws 35 are shown in Figs. 1 to 3, I may wish to use a single centrally located screw 35a as shown in Figs. 4 and 5, in which the construction and operation of the tester is similar to that of the tester of Figs. 1 to 3, except as now noted.

Only one housing 25 is required and consequently the stationary bridge member 10a and the shaft 52a are made short.

The single operating screw of Figs. 4 and 5 is provided with a longitudinal groove 35b receiving a lug 30b fast in the lower bushing 30a, which is held fast in the lower part of the housing 25. This prevents the screw from turning during operation.

The threads of the screw 35a extend to the lower end of the screw and are received fast in a threaded bore 125 of a block secured by corner screws 127 engaging in upwardly extending front standards 70a, similar to but taller than the standards 10 of Figs. 2 and 3. The upper inner edge portion of the standards 70a are rabbeted as at 128 to receive a similar rabbeted portion at the lower face of the block 126 to cooperate with the screws to hold the latter firmly in place.

The lower support 60a is only as wide as is necessary to support the bore 66, as shown in Fig. 4. The housing 116a is cut away as at 116b to receive the block 126.

The operation of the tester of Figs. 4 and 5 is the same as that of Figs. 1 to 3.

The invention claimed is:

1. In combination, a horizontally elongated member adapted to be fixedly supported above a test piece and having axially vertical bearings therein; pending screws slidable in the bearings and extending below the bearings and member; an internally threaded rotary collar on each screw in threaded engagement with the screw; means holding said collar against upward or downward movement relative to the member; means for rotating the collars; a movable bridge supported on the lower ends of the screws; a downwardly pointed penetrator vertically movably mounted on the movable bridge; and means for applying a testing force to the penetrator.

2. In combination, a stationary member adapted to be fixedly supported above a test piece and having an axially vertical bearing therein; a screw slidable in the bearing and extending below the bearing and member; an internally threaded collar on the screw in threaded engagement with the screw; means holding said collar against vertical movement; means for rotating the collar; a movable member fast on the lower end of the screw; a vertically movable penetrator mounted on the movable member; and means for applying a test load to the penetrator.

3. In combination, a penetrator support; a penetrator thereon; operating means for effecting relative approach of said support and a test piece; load means urging the penetrator toward the test piece; said operating means comprising a member disposable above the test piece and having a bearing therein; a substantially vertical screw slidable in the bearing and carrying said penetrator support at its lower end; an internally threaded collar on the screw in threaded engagement with the screw below the bearing; spring means pressing the collar against the bearing; and means for rotating the collar.

4. In combination, a stationary member adapted to be fixedly supported above a test piece and having a vertical bearing therein; a pending screw slidable in the bearing and extending below the bearing and member; an internally threaded collar on the screw in threaded engagement with the screw; means for rotating the collar; spring means pressing the collar upwardly against the bearing; a movable member fast on the lower end of the screw; a penetrator vertically movably mounted on the movable lower member; and means for applying a testing load to the penetrator.

5. In combination, a fixed bridge adapted to be fixedly supported above a test piece and having vertical bearings therein; pending screws slidable in the bearings and extending below the bearings and bridge; an internally threaded collar on each screw in threaded engagement with the screw; means for simultaneously rotating the collars; spring means pressing the collars upwardly against the bearings; a movable bridge fast on the lower ends of the screws; a plunger vertically movably mounted on the movable bridge and carrying a lower penetrator; and means for applying a testing load to the plunger.

6. In combination, a horizontally elongated fixed bridge adapted to be supported above a test piece and having upper bearing bores therein; housings secured fast on the bridge having lower bearing openings below said bores; bushings secured in said bearing bores and openings respectively; screws slidable in the bushings; an internally threaded collar on each screw against the upper bushing; a spring compressed between the lower bushing and the collar; means for simultaneously rotating said collars; a movable bridge fast on the lower ends of the screws; a vertically movable plunger mounted on the movable bridge and carrying a lower downwardly pointed penetrator; and means for applying a testing load to the plunger.

7. In combination, a fixed horizontal bridge having vertical end bores in its opposite ends, whereby the bridge may be fixedly secured to the lower face of a supporting beam fixedly supported above a test piece; said bridge having intermediate axially vertical upper bearing bores, and bosses surrounding the bearing bores; housings secured fast against the lower face of the bridge, each having an open upper end and received on one of the bosses, each housing having a lower wall having a lower bearing opening therein in vertical alinement with the upper bearing bore; intermediately flanged upper and lower bearing bushings in said bearing bores respectively, the flanges thereof engaging against said boss and lower wall respectively; screws slidable in the bushings; an internally threaded collar on each screw against the upper bushing; a spring compressed between the lower bushing and the collar; means for simultaneously rotating said collars; a movable bridge fast on the lower ends of the screws; a vertically movable plunger mounted on the movable bridge and carrying a lower downwardly pointed penetrator; and means for applying a testing load to the plunger.

8. In combination, a horizontally elongated fixed bridge adapted to be supported above a test piece and having upper bearing bores therein; housings secured fast on the bridge and having lower bearing openings; bushings secured in said bearing bores and openings respectively; screws slidable in the bushings; an internally threaded collar received on each screw and engaged with the upper bushing and having an intermediate flange and a reduced diameter lower portion; a bearing washer engaged on the lower face of the collar flange and having a lower reduced diameter portion, and inner rabbet groove receiving said reduced portion of the collar to hold the washer spaced from the screw; a thrust washer engaged against the lower face of the bearing washer and having an upper inner groove receiving the reduced portion of the bearing washer, and having a lower reduced diameter portion; a strong helical spring compressed between the thrust washer and the lower bushing and receiving the reduced diameter portion of said thrust washer; a movable bridge fast on the lower ends of the screws; a plunger vertically movably mounted on the movable bridge and carrying a lower penetrator; and means for applying a testing load to the plunger.

9. In combination, a fixed bridge adapted to be fixedly supported above a test piece and having vertical bearings therein; pending screws slidable in the bearings and extending below the bearings and bridge; an internally threaded worm wheel on each screw in threaded engagement with the screw; a rotary shaft mounted tangentially of the wheels and carrying worms for simultaneously rotating the wheels; means holding the wheels against upward or downward movement; a movable bridge fast on the lower ends of the screws; a plunger vertically movably mounted on the movable bridge and carrying a lower penetrator; and means for applying a testing load to the plunger.

10. In combination, a horizontally elongated fixed bridge adapted to be supported above a test piece and having lower bosses and upper bearing bores therein; housings secured fast on the said bosses and having lower bearing openings; bushings secured in said bearing bores and openings respectively and having intermediate flanges; an undercut collar mounted fast on the lower face of the boss around the associated bushing and having an inner flange engaged under the flange of the bushing to hold the bushing in the bore; screws slidable in the bushings; an internally threaded collar on each screw against the upper bushing; a worm wheel mounted fast on each collar and the upper face thereof; alined pairs of alined bearings set in opposite walls of the housings respectively; a worm shaft carried in said alined bearings and carrying fast thereon worms engaging said worm wheels respectively; a counterbalanced crank fast on one end of said shaft whereby said shaft, worms and worm wheels may be rotated to lower and raise the operating screws; a movable bridge fast on the lower ends of the screws; a vertically movable plunger mounted on the movable bridge and carrying a lower downwardly pointed penetrator; and means for applying a testing load to the plunger.

11. In combination, a stationary member adapted to be fixedly supported above a test piece and having an axially vertical bearing therein; a screw slidable in the bearing and extending below the bearing and member; an internally threaded collar on the screw in threaded engagement with the screw and held against vertical movement; means for rotating the collar; a movable member fast on the lower end of the screw; a vertically movable penetrator mounted on the movable member; means for applying a testing load to the penetrator; and a telescoping cup disposed over the upper end of the screw.

12. In combination, a fixed bridge adapted to be fixedly supported above a test piece and having vertical bearing openings having bearing bushings therein; pending screws slidable in the bushings and extending below the bushings and bridge; an internally threaded collar on each screw below the bushing in threaded engagement with the screw; means for holding said collar against the bushings; means for simultaneously rotating the collars; a movable bridge fast on the lower ends of the screws; a plunger vertically movably mounted on the movable bridge and carrying a lower penetrator; means for applying a testing load to the plunger; and inverted telescoping cups mounted over the ends of the operating screws respectively, each comprising an intermediate section, a lower section mounted on the bushing, and an upper section having an upper end wall.

13. In combination, a pair of suitably supported upright channel members having holes in a flange thereof; a horizontal channel beam having holes in its flanges and having its web disposed against the upper part of the webs of said members; angle pieces disposed against adjacent flanges of the beam and members; bolts passing through said holes and pieces to hold the beam and members together; a fixed bridge having end bores; bolts passing through the end bores and the lower flange of the beam for fixedly supporting the fixed bridge above a test piece disposed between said members; said bridge having vertical bearings therein; pending screws slidable in the bearings and extending below the bearings and bridge; an internally threaded collar on each screw below the collar in threaded engagement with the screw; means holding said collars against the bearings; means for rotating the collars; a movable bridge fast on the lower ends of the screws; a plunger vertically movably mounted on the movable bridge and carrying a lower penetrator; and means for applying a testing load to the plunger.

14. In combination, an elongated flat base adapted to receive a test piece thereon; upright columns mounted fast on the base near opposite ends thereof and having reduced upper ends; a horizontally elongated fixed bridge having vertical end bores received fast on said ends, said bridge having axially vertical bearings therein; pending screws slidable in the bearings and extending below the bearings and bridge; an internally threaded collar on each screw in threaded engagement with the screw, means for simultaneously rotating the collars; spring means pressing the collar upwardly against the bearings; a movable bridge fast on the lower ends of the screws; a plunger vertically movably mounted on the movable bridge and carrying a lower penetrator; and means for applying a testing load to the plunger.

15. In combination, a fixed bridge adapted to be supported above a test piece and having vertical bearings therein; pending screws slidable in the bearings and extending below the bearings and bridge and having reduced lower ends; an internally threaded collar on each screw in threaded engagement with the screw; means for supporting the collar on the bridge; means for rotating the collars; a movable bridge having end bores received and held fast on said reduced lower ends of the screws and having at its mid-part a central axially vertical bore and a rear extension perpendicular to the bridge; a base fast on said bridge and extension; and testing mechanism mounted on said base and extension and including a vertically movable plunger having a downwardly pointed penetrator below the movable bridge.

16. In combination, a member adapted to be supported above a test piece; a movable bridge having at its mid-part a central axially vertical bore and a rear extension perpendicular to the bridge; means entirely supported by said member for supporting the bridge on and below said member and raising and lowering the bridge; a base fast on said bridge and extension and having spaced front and rear standards; a plunger mounted for vertical movement in said central bore and having a penetrator below the bridge; a minor load spring engaging and pressing on the plunger; a major load power lever fulcrumed on said front standards adapted to press on the plunger; means including a lever fulcrumed on the rear standard and connected to power lever for raising and lowering the power lever; a dial gauge operatively connected to said plunger.

17. In combination, a stationary member adapted to be disposed above a part to be tested of a large machine; structure for supporting said member independently of such machine adapted to be entirely laterally offset from said large machine while supporting the member above said part to be tested; a movable member; means entirely supported and carried by the stationary member for supporting the movable member on and below the stationary member and gradually lowering the movable member relatively to the stationary member; a downwardly pointed substantially vertically movable penetrator carried on the movable member and projecting below said means and movable member; and means for applying a testing load to the penetrator.

18. In combination, a stationary member adapted to be disposed above a part to be tested of a large machine and having parts adapted to be attached to structure for supporting the member and having supporting parts adapted to be entirely laterally offset and independent of said large machine for supporting said structure when supporting the member above said part to be tested; a movable member; movable means entirely supported and carried by the stationary member for supporting the movable member on and below the stationary member and gradually lowering the movable member relatively to the stationary member and said part to be tested; a downwardly pointed downwardly movable penetrator carried on the movable member and projecting below said means and movable member and adapted to be engaged with said part to be tested; and means for applying a testing load to the penetrator.

19. In combination, a stationary member adapted to be disposed above a part to be tested on a large machine; structure connected to and supporting said member, when so disposed, and adapted to be entirely laterally offset from said large machine and supported independently of the machine while supporting said member above said part to be tested; a movable member; means entirely supported and carried by the stationary member for supporting the movable member on and below the stationary member and gradually lowering the movable member relatively to the stationary member and said part to be tested; a downwardly pointed downwardly movable penetrator carried on the movable member and projecting below said means and movable member and adapted to be engaged with said part to be tested; and means for applying a testing load to the penetrator.

20. In combination, a horizontally elongated stationary member adapted to be disposed above a part to be tested of a large machine and having intermediately therein a pair of substantially axially vertical bearings, and having parts adapted to be attached to structure for supporting the member and having supporting parts remote from said bearings and adapted to be entirely laterally offset from and independently of said large machine for supporting said structure when supporting said member above said part to be tested; pending screws slidable in the bearings; an internally threaded rotary collar on each screw; means holding the collar against upward or downward movement relative to the member; means for rotating the collars; a movable bridge supported fast on the lower ends of the screws; a downwardly pointed penetrator downwardly movably mounted on the movable bridge and adapted to be engaged with said part to be tested; and means for applying a testing load to the penetrator.

DAVID F. SKLAR.

REFERENCES CITED

The following references are of record in the file of this patent:

UNITED STATES PATENTS

| Number | Name | Date |
| --- | --- | --- |
| 934,776 | Vosper | Sept. 21, 1909 |
| 989,471 | Abraham | Apr. 11, 1911 |
| 1,477,851 | Root | Dec. 18, 1923 |
| 1,516,208 | Rockwell | Nov. 18, 1924 |
| 1,762,498 | Wilson | June 10, 1930 |
| 1,885,972 | Wilson | Nov. 1, 1932 |
| 1,993,103 | Labarre | Mar. 5, 1935 |
| 2,297,778 | Knerr et al. | Oct. 6, 1942 |
| 2,385,958 | Woxen | Oct. 2, 1945 |

FOREIGN PATENTS

| Number | Country | Date |
| --- | --- | --- |
| 81,378 | Sweden | Sept. 4, 1934 |